US010751610B2

(12) United States Patent
Leyland et al.

(10) Patent No.: US 10,751,610 B2
(45) Date of Patent: Aug. 25, 2020

(54) VIDEO GAMING WITH LOCATION FEATURES

(71) Applicant: Activision Publishing, Inc., Santa Monica, CA (US)

(72) Inventors: Robert Alfred Leyland, Novato, CA (US); I-Wei Huang, Dixon, CA (US)

(73) Assignee: Activision Publishing, Inc., Santa Monica, CA (US)

( * ) Notice: Subject to any disclaimer, the term of this patent is extended or adjusted under 35 U.S.C. 154(b) by 0 days.

(21) Appl. No.: 15/689,926

(22) Filed: Aug. 29, 2017

(65) Prior Publication Data

US 2019/0060743 A1 Feb. 28, 2019

(51) Int. Cl.
| | |
|---|---|
| A63F 13/216 | (2014.01) |
| A63F 13/92 | (2014.01) |
| A63F 13/31 | (2014.01) |
| A63F 13/77 | (2014.01) |
| A63F 13/34 | (2014.01) |
| G07F 17/32 | (2006.01) |
| A63F 13/35 | (2014.01) |
| H04W 4/02 | (2018.01) |
| H04W 4/80 | (2018.01) |
| G01S 19/48 | (2010.01) |
| H04L 29/06 | (2006.01) |
| G01S 19/19 | (2010.01) |

(52) U.S. Cl.
CPC ............ *A63F 13/216* (2014.09); *A63F 13/31* (2014.09); *A63F 13/34* (2014.09); *A63F 13/35* (2014.09); *A63F 13/77* (2014.09); *A63F 13/92* (2014.09); *G01S 19/48* (2013.01); *G07F 17/3218* (2013.01); *G07F 17/3255* (2013.01); *G07F 17/3281* (2013.01); *H04W 4/02* (2013.01); *H04W 4/80* (2018.02); *A63F 2300/407* (2013.01); *G01S 19/19* (2013.01); *H04L 67/38* (2013.01)

(58) Field of Classification Search
None
See application file for complete search history.

(56) References Cited

U.S. PATENT DOCUMENTS

| | | | | |
|---|---|---|---|---|
| 8,287,383 | B1 * | 10/2012 | Etter | H04L 67/38 463/42 |
| 9,131,339 | B1 * | 9/2015 | Kulfan | H04W 4/02 |
| 2002/0090985 | A1 * | 7/2002 | Tochner | A63F 13/12 463/1 |
| 2007/0155402 | A1 * | 7/2007 | Van Erlach | G06Q 30/0207 455/456.1 |
| 2007/0190494 | A1 * | 8/2007 | Rosenberg | A63F 13/12 434/11 |
| 2009/0186694 | A1 * | 7/2009 | Gunawardana | A63F 13/10 463/31 |

(Continued)

*Primary Examiner* — Tramar Y Harper
(74) *Attorney, Agent, or Firm* — Klein, O'Neill & Singh, LLP

(57) ABSTRACT

A video game may utilize mobile device location information in providing game rewards for a video game to game players. In some embodiments the video game is played on the mobile device. In some embodiments the video game is played on a non-mobile device, for example a game console. In some embodiments the mobile device is a smart phone, and in some embodiments the mobile device is a simple near field communication device.

10 Claims, 9 Drawing Sheets

(56) References Cited

U.S. PATENT DOCUMENTS

| | | | | |
|---|---|---|---|---|
| 2010/0287011 A1* | 11/2010 | Muchkaev | ............. | G06Q 30/02 379/93.13 |
| 2011/0028160 A1* | 2/2011 | Roeding | ................ | G06Q 30/00 455/456.1 |
| 2011/0244961 A1* | 10/2011 | Soelberg | ................ | G06F 3/017 463/32 |
| 2011/0313824 A1* | 12/2011 | Lara | ....................... | G06Q 30/00 705/14.1 |
| 2012/0052953 A1* | 3/2012 | Annambhotla | ....... | A63F 13/332 463/40 |
| 2012/0077593 A1* | 3/2012 | Sarmenta | ............ | A63F 3/00643 463/40 |
| 2013/0005475 A1* | 1/2013 | Mahajan | ............... | A63F 13/216 463/42 |
| 2013/0006737 A1* | 1/2013 | Goldberg | ............... | G06Q 30/02 705/14.12 |
| 2013/0150139 A1* | 6/2013 | Oakes | .................. | G07F 17/326 463/16 |
| 2013/0165237 A1* | 6/2013 | Park | ..................... | A63F 13/211 463/42 |
| 2013/0331192 A1* | 12/2013 | Betti | ...................... | A63F 13/12 463/42 |
| 2014/0364199 A1* | 12/2014 | Baerlocher | ......... | G07F 17/3244 463/25 |
| 2014/0370959 A1* | 12/2014 | Yacenda | ............ | G07F 17/3241 463/18 |
| 2015/0258451 A1* | 9/2015 | Veverka | ............. | G07F 17/3262 463/10 |
| 2016/0339347 A1* | 11/2016 | Welsh | .................... | A63F 13/92 |

\* cited by examiner

VIDEO GAMING WITH LOCATION FEATURES

BACKGROUND OF THE INVENTION

The present invention relates generally to video games, and more particularly to video games making use of real world location information.

Video games provide a source of entertainment for many. Video games often provide an interactive activity that can be interesting and challenging, and may allow game players to engage in simulated activities that may otherwise be unavailable. In doing so, some video games may provide a high degree of realism, with rapidly evolving action and associated stunning visual displays.

In providing that realism, some such video games may rely on, or in some cases even require, computer equipment with processing power sufficient to render at approximately real-time rates large and detailed visual action, and displays sufficiently large to display the visual action in an immersive manner. Such computer equipment may be available at a game player's home or other location. Unfortunately, the use of such equipment may lack interaction with the broader physical world, particularly for video game play centered about a specialized video game device or general purpose computer configured to provide video game play.

Some video games are available for use on mobile devices. The mobile devices may be convenient for a game player to carry on his or her person while traveling about, and may allow for a level of interaction with the physical world, for example due to location sensing capability of the mobile device. Mobile devices, however, may lack the graphic processing capabilities used in other less-mobile applications, and screen size may be limited for mobile applications.

BRIEF SUMMARY OF THE INVENTION

Some embodiments provide for mobile device based video game play. Some embodiments provide for mobile device location information usage for video game play. Some embodiments provide a link between mobile device location information and/or mobile device interpersonal contact information and non-mobile video game play. Some embodiments provide non-mobile video game play rewards based on mobile device location information. Some embodiments provide modification of non-mobile video game play based on mobile device location information. Some embodiments provide for transfer of non-mobile video game play objects based on mobile device interpersonal contact information. Some embodiments provide for pairing of opponents and/or teammates based on mobile device location information and/or mobile device interpersonal contact information.

Some embodiments provide for mobile device video game play making use of mobile device location information. Some embodiments provide for mobile device video game play rewards based on mobile device GPS location information and based on mobile device interaction with a short range communication device, which in various embodiments may be a near field communications (NFC) device, for example a Radio Frequency Identification device (RFID) reader or an infrared communication device and in some embodiments may be a Bluetooth device or an 802.11 device (which may be referred to as a Wifi device). In some embodiments, the mobile device video game play rewards may be sponsored by a sponsoring entity, for example a retail establishment, with the GPS location information required to be indicative of presence at the retail establishment, and the short range communication device, for example an NFC device, located at a particular location or locations within the retail establishment. In other embodiments the sponsoring entity may sponsor a location at other than a location of the sponsoring entity, for example a location of public interest, or some other location. In some embodiments the mobile device video game play rewards may be based on mobile device location information indicative of presence, over time, at a plurality of locations, or presence at a particular location at multiple different times, for example on different days or at different hours of a single day.

Some embodiments provide for non-mobile game video game play rewards based on prior mobile device GPS location information and based on mobile device interaction with a short range communication device, which may be a near field communications (NFC) device, for example a Radio Frequency Identification device (RFID) reader or an infrared communication device, or a Bluetooth device or a Wifi device. In some embodiments, the video game play rewards may be sponsored by a sponsoring entity, for example a retail establishment, with the GPS location information required to be indicative of presence at the retail establishment, and the short range communication device, for example the NFC device, located at a particular location or locations within the retail establishment. In other embodiments the sponsoring entity may sponsor a location at other than a location of the sponsoring entity, for example a location of public interest, or some other location. In some embodiments the video game play rewards may be based on mobile device location information indicative of presence, over time, at a plurality of locations, or presence at a particular location at multiple different times, for example on different days or at different hours of a single day.

Some embodiments provide for provision of additional powers or capabilities for use in mobile device video game play, or non-mobile system video game play in some embodiments, based on a plurality of game players being at a common location. For example, in some embodiments the additional powers or capabilities are provided after receiving an indication that a mobile device of a game player has been located at a same location, and in some embodiments at the same time, as a mobile device of another game player. Also for example, in some embodiments the additional powers or capabilities are provided after receiving an indication that a mobile device of a game player has communicated with a mobile device of another game player using NFC protocols, in some embodiments, and/or more generally using short range communication protocols, in some embodiments.

In some embodiments the mobile devices may be a smartphone. In some embodiments the mobile devices may be a user-wearable device with NFC capabilities. In some embodiments the mobile devices may be a watch or other user adornment with NFC capabilities.

Some embodiments provide for pairing of teammates in mobile device video game play, or non-mobile system video game play in some embodiments, based on a plurality of game players being at a common location. For example, in some embodiments game players are joined as a team for non-mobile video game play after receiving an indication that a mobile device of a game player has been located at a same location, and in some embodiments at the same time, as a mobile device of one or more other game players. Also for example, in some embodiments the game players are joined as a team after receiving an indication that a mobile device of a game player has communicated with a mobile device of another game player using NFC protocols in some embodiments, and/or more generally using short range communication protocols in some embodiments.

Some embodiments provide for a method for providing for using mobile device location in play of a video game, comprising: receiving GPS location information from a mobile device; receiving an indication that the mobile device has communicated with a short range communication device having a known location; determining a game play reward for play of a video game based on the GPS location information of the mobile device and the indication that the mobile device has communicated with the short range communication device, the game play reward usable during play of the video game; providing information of the game play reward to a game device. In some embodiments the short range communication device is a near field communication (NFC) device.

Some embodiments provide for a system for use with respect to play of a video game, comprising: a server configured by program instructions to: determine game play rewards for play of a video game based on GPS location information from a mobile device and information indicating that the mobile device has communicated with a short range communication device. In some embodiments the short range communication device is a near field communication (NFC) device.

These and other embodiments and aspects of the invention are more fully comprehended upon review of this disclosure.

DETAILED DESCRIPTION

Figure 1:
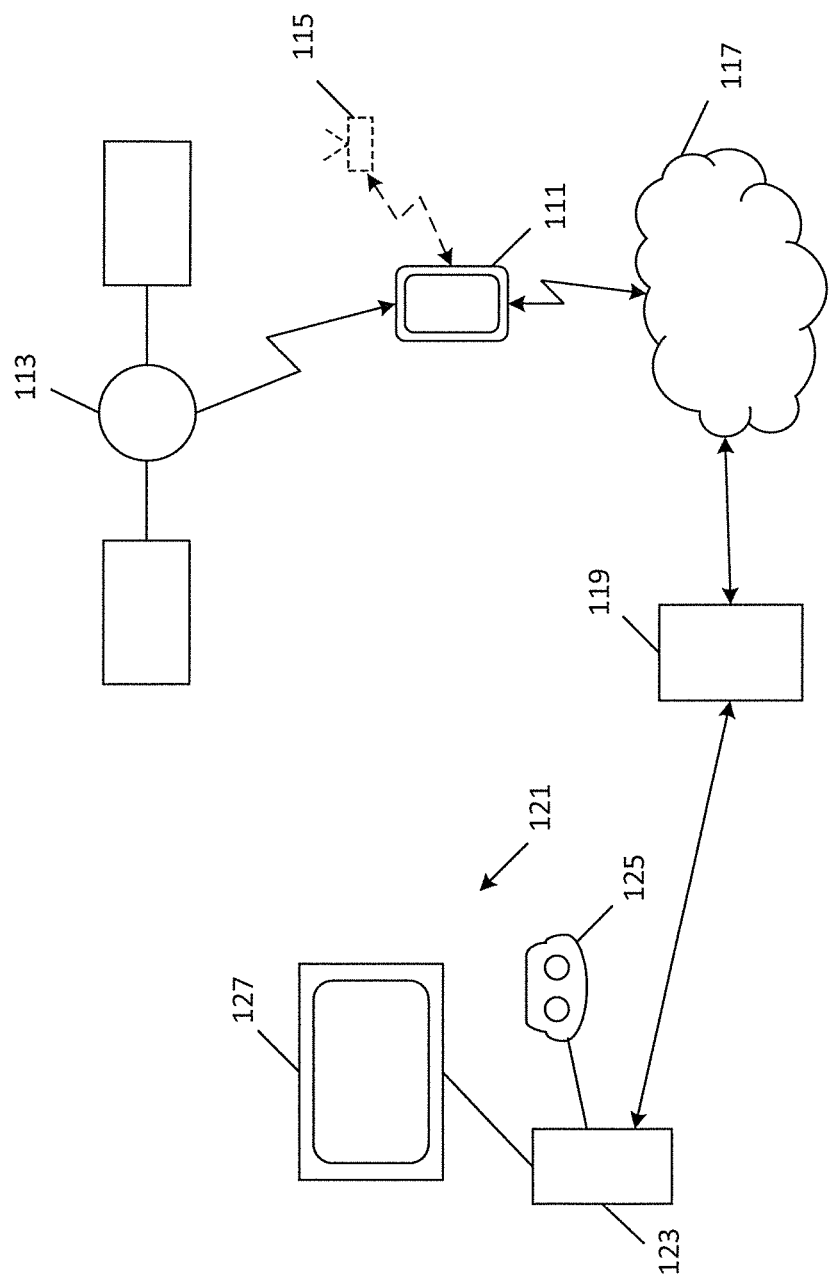
FIG. 1 illustrates an example of a system with a video game utilizing position information in accordance with aspects of the invention.

FIG. 1 illustrates an example of a system with a video game utilizing position information in accordance with aspects of the invention. In some embodiments the video game is a video game played on a mobile device. In some embodiments the video game is a video game played, at least partly, on a non-mobile system, but having aspects modified or provided based on position information of a mobile device. In various embodiments the position information may be based on short range communications information, alone or in conjunction with satellite position information, for example Global Positioning System (GPS) information.

As illustrated in FIG. 1, the system includes a mobile device 111, a positioning system satellite constellation 113 (represented by a single satellite), a mobile device 103, and in some embodiments a short range communications device 115. In some embodiments the short range communications device is a near field communication (NFC) device. The mobile device is also in communication with a network 117, which in some embodiments is a cellular phone network, in some embodiments is a wide area network, including the Internet in some embodiments, and in some embodiments is a network including a cellular phone network and a wide area network such as the Internet. In many embodiments a plurality of mobile devices may be included, but for clarity of the drawing only a single mobile device is illustrated in FIG. 1.

In some embodiments the mobile device determines a position of the mobile device. The mobile device may be uniquely associated with a particular game player, or communications from the mobile device may specify that the mobile device is being used by a particular game player. The mobile device typically includes one or more processors, memory, and various interface circuitry. In some embodiments the mobile device also includes a display, for example for displaying visual displays relating to play of a video game. The mobile device includes circuitry, which may be in the form of a processor executing program instructions, for determining device position and providing data communications, in many instances including voice communications. Many cellular phones provide such functions, and in many embodiments, the mobile device may be a cell phone, for example a smartphone. In some embodiments, the circuitry may be capable of determining, on its own, a position of the device using received signals. In some embodiments, the circuitry for determining device position may perform part of the functions of determining position, while making use of processing performed by a remote system for performing other parts of the processing. In many embodiments, the circuitry for determining device position determines device position using Global Positioning System (GPS) information, provided for example by way of GPS satellites and the circuitry may include a GPS receiver and associated circuitry. In some embodiments the mobile device also or instead includes short range communications or NFC circuitry, for example circuitry providing for Bluetooth, Wifi, NFC, or other communications capability.

In some embodiments the mobile device is also configured to provide for video game play. In some embodiments the video game play may include features related to determination that the mobile device is present at, or in some embodiments has been present at, one or more predetermined locations. In some embodiments the video game play may include features related to determination that the mobile device is present at a particular location, as determined using GPS circuitry determined location, and/or that the mobile device is present at some particular location as indicated by short range communications or NFC circuitry.

In some embodiments, and as illustrated in FIG. 1, the system includes a game server 119. The game server includes circuitry to communicate over the network with the mobile device. In some embodiments, the game server may comprise program instructions executing on a computer or a plurality of computers, a processor or processors of such computers, or in some embodiments, the game server may be considered the computer or computers themselves. The computer or plurality of computers typically includes one or more processors, memory, storage device, and may contain software applications and a database or database-like component. The one or more processors typically execute program instructions stored in memory or on the storage device related to the execution of a video game server related functions. The game server processes information from the mobile device, stores information relating to video game play, in some embodiments, and, in some embodiments, provides video game data to the mobile device.

In some embodiments, and as illustrated in FIG. 1, the system includes a game device 121. The game device is coupled over a network, for example the Internet, to the game server. As illustrated in FIG. 1, the game device includes a game console 123, with the game console receiving user inputs by way of a user input device 125, for example a game controller, and displaying game action on a display device 127. In various embodiments, other components, or fewer or additional components may be used. For example, in various embodiments personal computers may be used instead of or in addition to a game console. In most embodiments, a plurality of mobile communications devices and game devices may be part of the system of FIG. 1.

In operation in some embodiments, the server, for example by executing program instructions on the one or more processors, determines video game play information based on location information provided by the mobile device and game play related requests provided by the mobile devices and/or game devices, and commands transmission of at least some of the game play information to the mobile devices and/or game devices.

In some embodiments, video game play related location information may be generated using short range communications devices, in some embodiments NFC devices, alone or in conjunction with GPS location information generated using a mobile. The short range communication related information, and particularly NFC related information, may be useful, for example, in determining mobile device location information at a granularity that may not be available or always available using GPS information alone.

Figure 2:
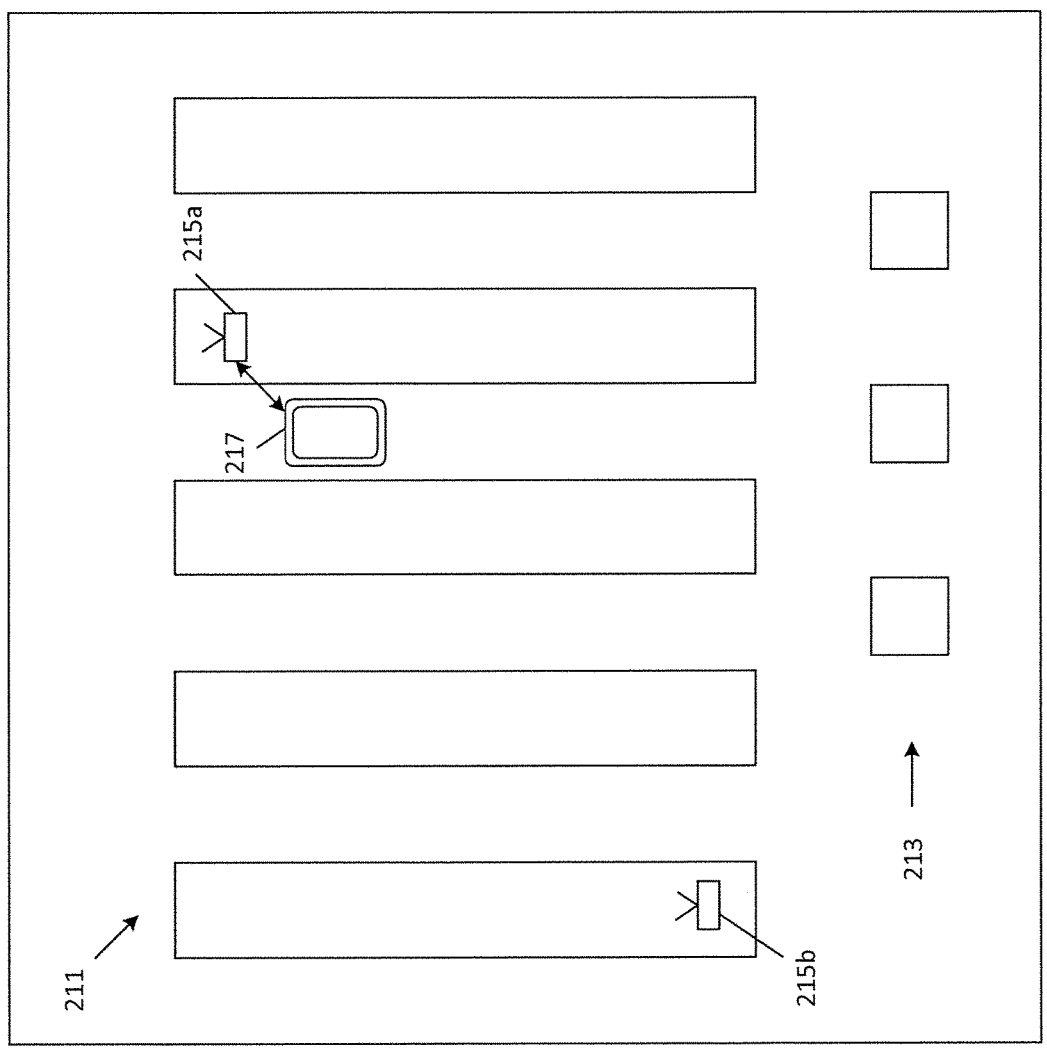
FIG. 2 is a semi-block diagram semi-top view of a retail establishment configured for use in accordance with aspects of the invention.

FIG. 2, for example, is a semi-block diagram semi-top view of an example retail establishment, or a portion of a retail establishment, including short range communication devices, which may be NFC devices. The layout of the retail establishment is exemplary only. The view of FIG. 2, for example may show all of a retail establishment, one floor of several floors of a retail establishment, or a portion of one floor of a retail establishment. In the embodiment of FIG. 2, the retail establishment includes a plurality of aisles 211 arranged in parallel, in which various goods for sale may be displayed. A plurality of checkout counters 213 are arranged towards a front of the store, with the checkout counters aligned generally perpendicular to alignment of any one of the plurality of aisles. Of course, various retail establishments may have other configurations than as presented in FIG. 2, and may have differing displays or sale methods.

The retail establishment includes a first short range communication device 215a, which may be an NFC device on one aisle towards one side of the establishment, and a second short range communication device 215b, which may be an NFC device, on another aisle towards another side of the establishment. In some embodiments the short range communication devices may be Bluetooth devices or Wifi devices. In some embodiments the Bluetooth devices may be Bluetooth Low Energy (LE) devices, or Bluetooth devices operated at low energy levels, decreasing range of the devices.

As illustrated in FIG. 2, a mobile device is near the first short range communication device, and in communication with the first short range communication device. In some embodiments the mobile device receives data from the short range communication device, with the mobile device configured to communicate that data, or information generated using that data, to indicate to a server that the mobile device was near the short range communication device. In some embodiments the short range communication device is coupled to a network in communication with the server, with the short range communication device receiving identifying information, for example of a game player, and providing the identifying information (along with information indicating a location of the short range communication device) to the server.

In some embodiments the mobile device also may communicate GPS based information indicating location of the mobile device to the server. The communication may, for example, make use of cellular communication pathways. In some embodiments the GPS based information may, for example, be communicated prior to movement of the mobile device into a building housing the retail establishment, or upon exit from the retail establishment. In some embodiments the GPS based information may be communicated in response to a request from the short range communication device, with the GPS based information being then current GPS information, if available, or, as more likely, last valid GPS based information.

Figure 3:
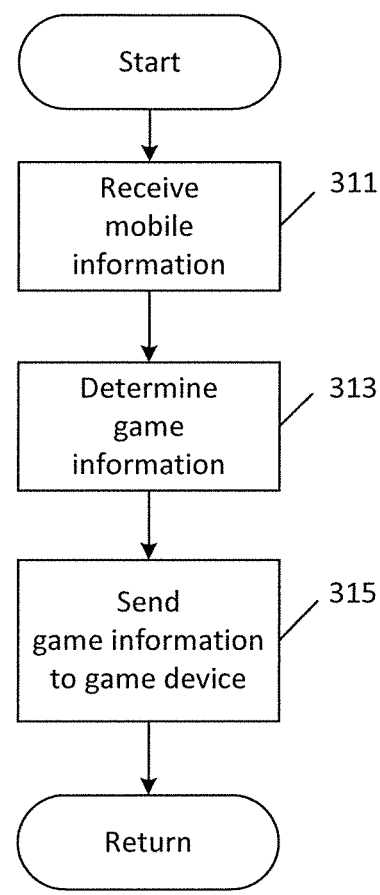
FIG. 3 is a flow diagram of a process for determining game information using information from a mobile device in accordance with aspects of the invention.

FIG. 3 is a flow diagram of a process for determining game information using information from a mobile device in accordance with aspects of the invention. In some embodiments the process is performed by the system of FIG. 1. In some embodiments the process is performed by a server, for example the server of FIG. 1. In some embodiments the process is performed by a server and a mobile device, for example the server and mobile device of FIG. 1. In some embodiments the process is performed by a server, a mobile device, and a game device, for example the server, the mobile device, and the game device of FIG. 1. In some embodiments the process is performed by a processor, for example as programmed by program instructions.

In block 311 the process receives mobile device location information. In some embodiments the mobile device location information is location information from a mobile device. In some embodiments the mobile device location information is location information developed by GPS circuitry of a mobile device. In some embodiments the mobile device location information indicates that the mobile device is in communication with a short range communication device having a predetermined location. In some embodiments the mobile device location information indicates that the mobile device is in communication with an NFC device having a predetermined location. In some embodiments the mobile device location information is received from a mobile device, for example through a networked communication pathway, which may include a cellular communication pathway.

In block 313 the process determines game information, based on the mobile device location information. In some embodiments the process determines whether a game player associated with the mobile device should receive a game reward.

In some embodiment the game reward is points in a video game. In some embodiments the game reward is increased or additional ability or capability in a video game. In some embodiments the game reward is a game object, for example a game object for use in a video game. In some embodiments the game reward is a game reward for a video game playable on the mobile device, and in some embodiments a video game which is playable on a mobile device but not on some other game device, for example a game console. In some embodiments the game reward is a game reward for a video game playable on a game device, other than a mobile device, for example a game console.

In some embodiments the process determines the game player should receive the game reward if the mobile device location information indicates the mobile device is located at a predetermined location. In some embodiments the predetermined location may be any of a plurality of predetermined locations. In some embodiments the mobile device location information includes both short range communication device derived location information and mobile device derived location information, for example mobile device GPS location information, and both types of location information must be consistent for the game player to receive the game reward. In some embodiments the mobile device location information includes both NFC device derived location information and mobile device derived location information, for example mobile device GPS location information, and both types of location information must be consistent for the game player to receive the game reward. In some embodiments the process determines the game player should receive the game reward if the mobile device location information indicates the mobile device has been located, over time, at a plurality of different predetermined locations. In some embodiments the plurality of different predetermined locations have a common theme, for example are all national parks, are all different locations for a common retail brand or franchise, or are all otherwise related.

In some embodiments the game reward is based on the location indicated by the mobile device location information. In some embodiments each location provides for a different reward. In some embodiments different sets of locations may provide for different rewards. In some embodiments different rewards may be provided for the same site, but at different times, for example at different times of the day, different days of the week, different months, or at different holiday seasons.

In block 315 the process provides the game information to a game device. In some embodiments the game information is an indication of the game reward. In some embodiments the game device is the mobile device. In some embodiments the game device is a non-mobile game device, for example a game console. In some embodiments the game device is associated with the same game player as the mobile device. In some embodiments the game information includes information as to a video game to which the game reward applies.

The process thereafter returns.

Figure 4:
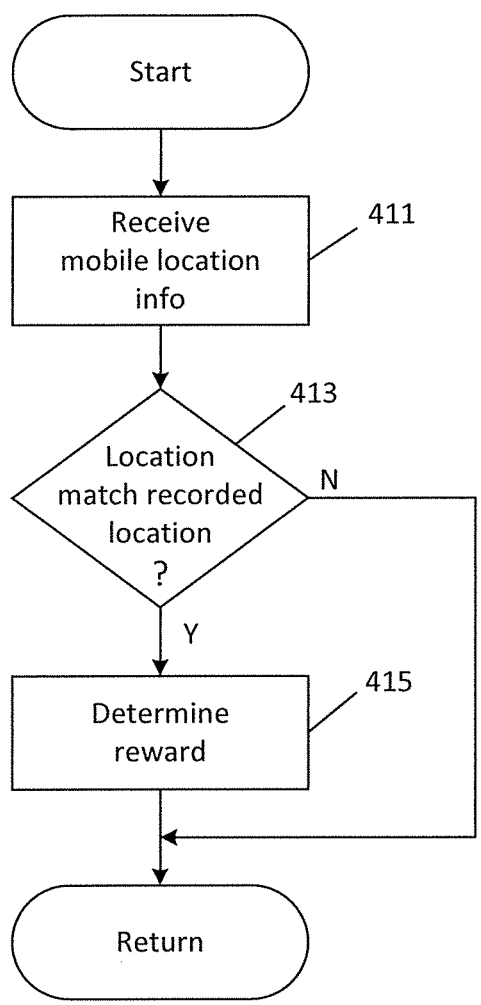
FIG. 4 is a flow diagram of a process of an embodiment for determining game information using information from a mobile device in accordance with aspects of the invention.

FIG. 4 is a flow diagram of a process of an embodiment for determining game information using information from a mobile device in accordance with aspects of the invention. In some embodiments the process is performed by the system of FIG. 1. In some embodiments the process is performed by a server, for example the server of FIG. 1. In some embodiments the process is performed by a server and a mobile device, for example the server and mobile device of FIG. 1.

In some embodiments the process is performed by a server, a mobile device, and a game device, for example the server, the mobile device, and the game device of FIG. 1. In some embodiments the process is performed by a processor, for example as programmed by program instructions. In some embodiments the process performs operations of blocks 311 and 313 of the process of FIG. 3.

In block 411 the process receives location information for a mobile device. In some embodiments the mobile device location information is location information from a mobile device. In some embodiments the mobile device location information is location information developed by GPS circuitry of a mobile device. In some embodiments the mobile device location information indicates that the mobile device is in communication with a short range communication device having a predetermined location. In some embodiments the mobile device location information indicates that the mobile device is in communication with an NFC device having a predetermined location. In some embodiments the mobile device location information is received from a mobile device, for example through a networked communication pathway, which may include a cellular communication pathway.

In block 413 the process determines if the mobile device location information matches location information for a predetermined location. The predetermined location may be, for example, a particular geographic location, a particular retail establishment, a particular park, or some other location. In various embodiments the predetermined location may be one of a plurality of different predetermined locations.

If the mobile device location information does not match the predetermined location, the process returns. If the mobile device location information does match the predetermined location, however, the process continues to block 415.

In block 415 the process determines a game play reward for play of a video game. In some embodiments the process performs the operations of block 415 in response to determining that the mobile device location information matches the predetermined location. In some embodiment the game reward is points in a video game. In some embodiments the game reward is increased or additional ability or capability in a video game. In some embodiments the game reward is a game object, for example a game object for use in a video game. In some embodiments the game reward is a game reward for a video game playable on the mobile device, and in some embodiments a video game which is playable on a mobile device but not on some other game device, for example a game console. In some embodiments the game reward is a game reward for a video game playable on a game device, other than a mobile device, for example a game console.

The process thereafter returns.

Figure 5:
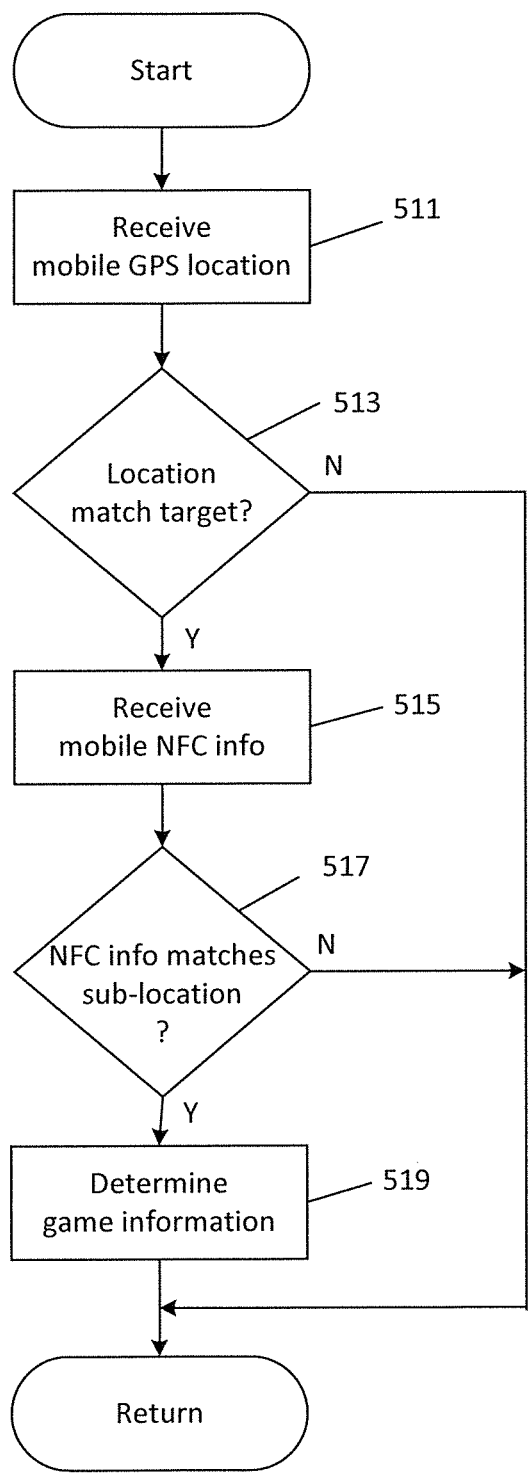
FIG. 5 is a flow diagram of a process of an embodiment for determining game information using information from a mobile device in accordance with aspects of the invention.

FIG. 5 is a flow diagram of a process of an embodiment for determining game information using information from a mobile device in accordance with aspects of the invention. In some embodiments the process is performed by a system as discussed with respect to FIG. 1. In some embodiments the process is performed by a server, for example the server of FIG. 1. In some embodiments the process is performed by a server and a mobile device, for example the server and mobile device of FIG. 1. In some embodiments the process is performed by a server, a mobile device, and a game device, for example the server, the mobile device, and the game device of FIG. 1. In some embodiments the process is performed by a server, a mobile device, and a short range communication device, for example the server, mobile device, and NFC device of FIG. 1. In some embodiments the process is performed by a server, a mobile device, and an NFC device, for example the server, mobile device, and NFC device of FIG. 1. In some embodiments the process is performed by a processor, for example as programmed by program instructions. In some embodiments the process performs operations of blocks 311, 313, and 315 of the process of FIG. 3.

In block 511 the process receives location information for a mobile device. In some embodiments the mobile device location information is location information from a mobile device. In some embodiments the mobile device location information is location information developed by GPS circuitry of a mobile device. In some embodiments the mobile device location information is received from a mobile device, for example through a networked communication pathway, which may include a cellular communication pathway.

In block 513 the process determines if the mobile device location information matches location information for a predetermined location. The predetermined location may be, for example, a particular geographic location, a particular retail establishment, a particular park, or some other location. In various embodiments the predetermined location may be one of a plurality of different predetermined locations.

If the mobile device location information does not match the predetermined location, the process returns. If the mobile device location information does match the predetermined location, however, the process continues to block 515.

In block 515 the process receives short range communication device information. In some embodiments the process receives NFC device information. In some embodiments the short range communication device information is received from the mobile device. In some embodiments the short range communication device information is received from an NFC device. In some embodiments the NFC device information is received from the mobile device. In some embodiments the NFC device information is received from an NFC device.

In block 517 the process determines if the short range communication device information indicates the mobile device is in, or has been in, communication with a short range communication device at a particular location. In some embodiments the short range communication device is an NFC device, and the process determines if the NFC device information indicates the mobile device is in, or has been in, communication with an NFC device at a particular location. For example, referring to only an NFC device embodiment for simplicity of discussion, the NFC device may be at a particular location within a retail establishment, with the retail establishment being the predetermined location discussed with respect to block 513. The NFC device location may therefore be considered a sub-location of the particular location, in some embodiments. In some embodiments the NFC device information may be information from the mobile device that indicates the mobile device is in communication with a particular NFC device having a known location. In some embodiments the NFC device information may be information from the NFC device, having a known location, that indicates the mobile communication device is in communication with the NFC device.

If the short range communication device information does not indicate that the mobile device is in, or has been in, communication with the short range communication device at a particular sub-location, the process returns. Otherwise the process proceeds to block 519.

In block 519 the process determines a game play reward for play of a video game. In some embodiments the process performs the operations of block 519 in response to determining that the mobile device location information and the short range communication device information matches the predetermined location and the predetermined sub-location. In some embodiment the game reward is points in a video game. In some embodiments the game reward is increased or additional ability or capability in a video game. In some embodiments the game reward is a game object, for example a game object for use in a video game. In some embodiments the game reward is a game reward for a video game playable on the mobile device, and in some embodiments a video game which is playable on a mobile device but not on some other game device, for example a game console. In some embodiments the game reward is a game reward for a video game playable on a game device, other than a mobile device, for example a game console.

The process thereafter returns.

Figure 6:
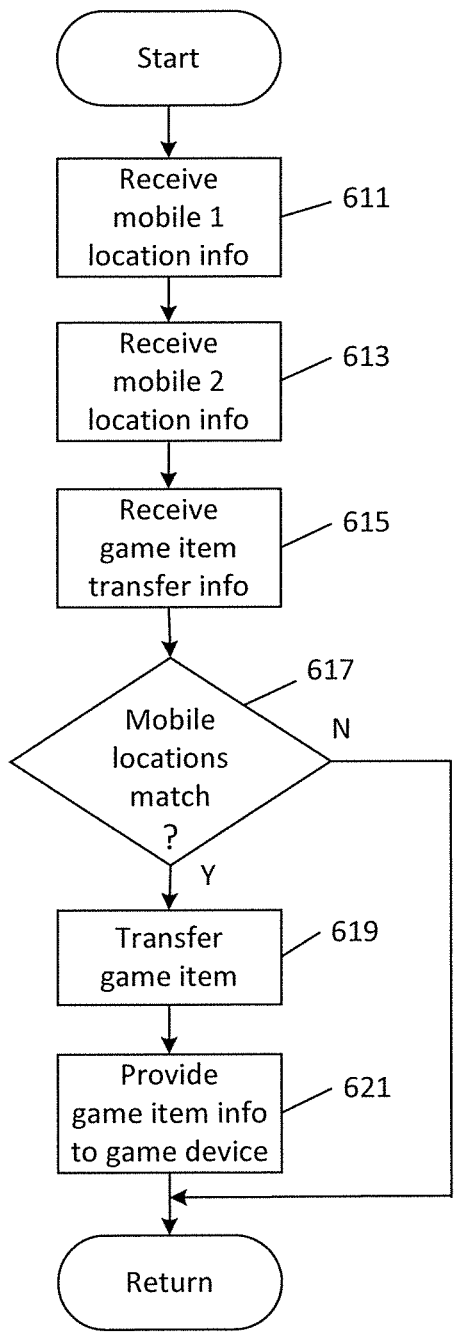
FIG. 6 is a flow diagram of a process of an embodiment for transferring a game in accordance with aspects of the invention.

FIG. 6 is a flow diagram of a process of an embodiment for transferring a game item in accordance with aspects of the invention. In some embodiments the process is performed by a system as discussed with respect to FIG. 1. In some embodiments the process is performed by a server, for example the server of FIG. 1. In some embodiments the process is performed by a server and a plurality of mobile devices, for example including the server and mobile device of FIG. 1. In some embodiments the process is performed by a server, a plurality of mobile devices, and a game device, for example the server, the mobile device, and the game device of FIG. 1. In some embodiments the process is performed by a processor, for example as programmed by program instructions. In some embodiments the process performs operations of blocks 311 and 313 of the process of FIG. 3.

In block 611 the process receives location information for a first mobile device. In some embodiments the mobile device location information is location information from the first mobile device. In some embodiments the mobile device location information is location information developed by GPS circuitry of the first mobile device. In some embodiments the mobile device location information is received from the first mobile device, for example through a networked communication pathway, which may include a cellular communication pathway.

In block 611 the process receives location information for a second mobile device. In some embodiments the mobile device location information is location information from the second mobile device. In some embodiments the mobile device location information is location information developed by GPS circuitry of the second mobile device. In some embodiments the mobile device location information is received from the second mobile device, for example through a networked communication pathway, which may include a cellular communication pathway.

In block 615 the process receives information regarding transfer of a game item for a video game from a game player associated with the first mobile device to a game player associated with the second mobile device. In some embodiments the information is received from the first mobile device. In some embodiments the information is received from the second mobile device. In some embodiments the information is received from both the first mobile device and the second mobile device. In some embodiments the game item is a virtual game item, for example that may be used by a virtual game character in the video game.

In block 617 the process determines if the location information for the first mobile device and the location information for the second mobile device indicates that the first and second mobile devices are at the same location. If not, the process returns. Otherwise the process proceeds to block 619.

In block 619 the process transfer video game ownership of the game item from the first game player to the second game player.

In block 621 the process provides information of the game item to a game device. In some embodiments the game device is the second mobile device. In some embodiments the game device is a non-mobile game device, for example a game console, associated with the second game player. In some embodiments the information of the game item includes information as to a video game to which the game reward applies.

The process thereafter returns.

In some embodiments the mobile device may be a simple short range communication device, without cellular communication capability. In some embodiments the simple short range communication device may have local area networking capability, for example WiFi capability. In some embodiments, however, the simple short range communication device may have no other wireless communication capability other than NFC capability, and the simple short range communication device may be considered a simple NFC device.

In such embodiments, the simple short range communication device, which in some embodiments is the simple NFC device, may only provide location information capability by communicating with another short range communication device, or another NFC device, that has a known location. In the case of determining common locations of game players, this may be by way of communicating with a mobile device or a simple short range communication device, which may be a simple NFC device, of another game player.

Figure 7:
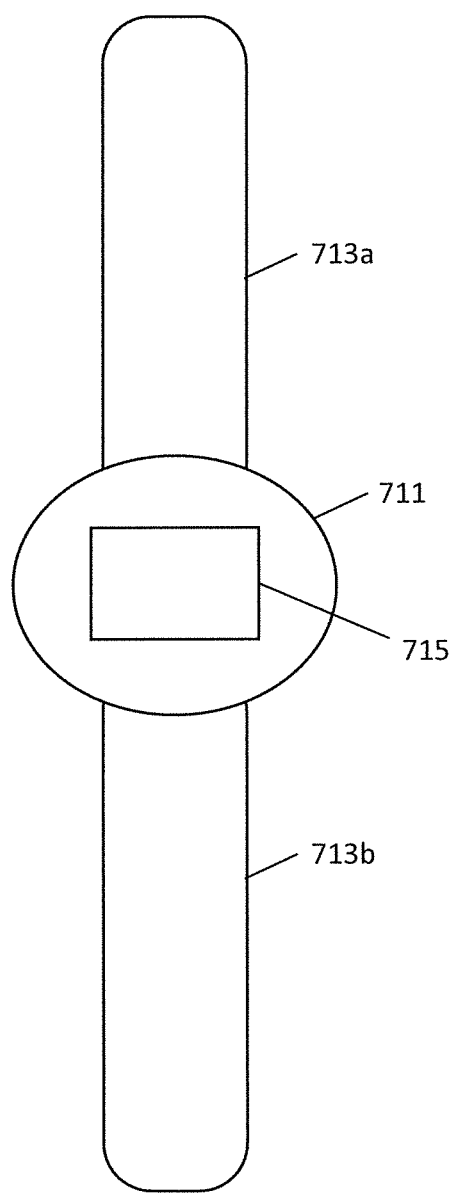
FIG. 7 illustrates an example form of a simple short range communication device in accordance with some aspects of the invention.

FIG. 7 illustrates an example form of a simple short range communication device, which is a simple NFC device in some embodiments, in accordance with some aspects of the invention. The example simple short range communication device is in the form of a wrist watch, having a casing 711, with straps 713*a* and 713*b* extending from opposing sides of the casing. The casing may house electrical and/or electronic circuitry providing short capability, along with other processing capability. In addition, in some embodiments the casing may include a display for example a display 715 as shown in FIG. 7, or a visual indicator, for example an LED light. In some embodiments the casing may also include other circuitry or devices, for example an accelerometer and related circuitry.

Figure 8:
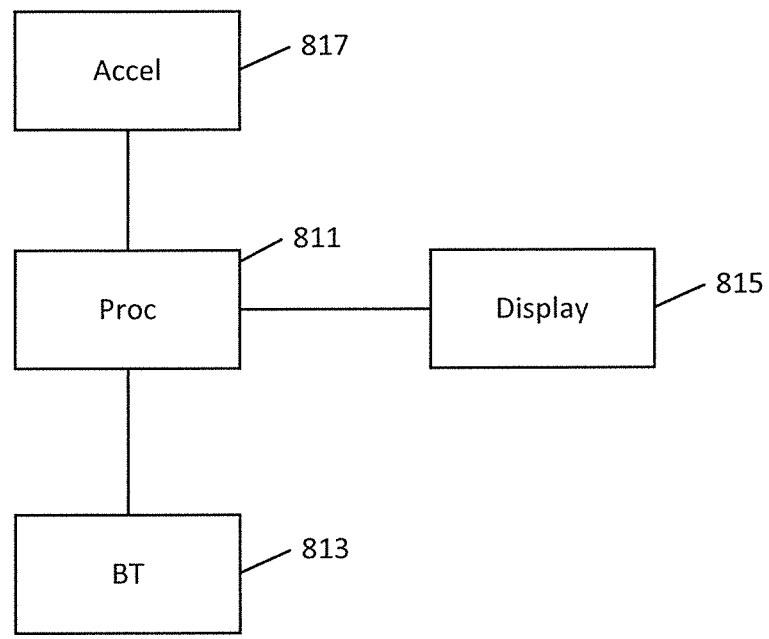
FIG. 8 is a block diagram of an example simple short range communication device, for example the simple short range communication device of FIG. 7.

FIG. 8 is a block diagram of an example simple short range communication device, for example the simple short range communication device of FIG. 7. The simple short range communication device includes a processor 811 and short range communication circuitry, for example Bluetooth circuitry 813. The Bluetooth circuitry, for example, may implement Bluetooth Low Energy communications. In some embodiments the processor and the Bluetooth circuitry may be resident on a same semiconductor chip, or present in a same multi-chip module. In some embodiments the processor processes information received by the Bluetooth circuitry over a wireless Bluetooth communications channel and prepares information for and commands transmission using the Bluetooth circuitry.

The example simple short range communication device of FIG. 8 also includes a display 815 and an accelerometer 817. In some embodiments the processor controls display of information on the display, for example information relating to a game state or actions relating to a video game. In some embodiments the processor modifies information relating to the game state based on information received over the wireless Bluetooth communications channel. In some embodiments the processor prepares information for transmission and commands transmission using the Bluetooth circuitry based on input from the accelerometer. For example, in some embodiments the processor commands the Bluetooth circuitry to transmit information indicative of the game player upon an input from the accelerometer indicating a deceleration with an absolute magnitude greater than a predetermined magnitude. Also, for example, upon such an occurrence the processor may command transmission of additional and/or different information depending on whether the processor has processed information received over the Bluetooth communications channel indicating presence of a mobile device of another game player.

Figure 9:
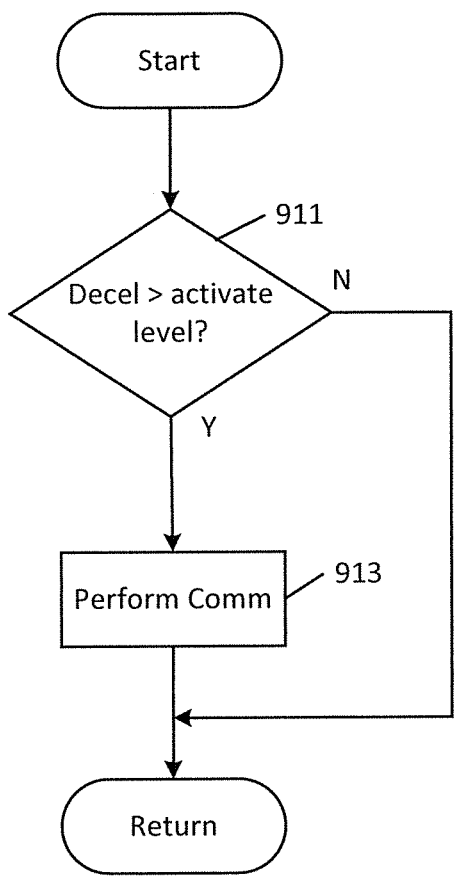
FIG. 9 is a flow diagram of an example process of operation of a simple short range communication device, for example the device of FIG. 7 or 8.

FIG. 9 is a flow diagram of an example process of operation of a simple short range communication device, for example the device of FIG. 7 or 8. In some embodiments the process is performed by a processor of the simple NFC device, for example as programmed by program instructions.

In block 911 the process determines if an accelerometer indicates a deceleration with an absolute magnitude greater than a predetermined magnitude. In some embodiments such a deceleration may occur, for example, when the simple short range communication device is bumped against a surface, for example a top of a table or desk, or a simple short range communication device of another game player. Also for example, such a deceleration may occur, in some embodiments in which the simple short range communication device is worn on a game player's wrist, when the game player moves a hand of an arm with the device, or otherwise suddenly stop movement in a particular direction of the hand of an arm with the device.

If the process determines the accelerometer indicates such a deceleration, the process continues to block 913, otherwise the process returns.

In block 913 the process performs short range communications. In some embodiments the processor commands Bluetooth circuitry to transmit information. In some embodiments the information identifies the simple short range communication device and/or identifying a game player associated with the short range communication device. In some embodiments the information is otherwise related to a video game.

The process thereafter returns.

Although the invention has been discussed with respect to various embodiments, it should be recognized that the invention comprises the novel and non-obvious claims supported by this disclosure.

What is claimed is:

1. A method for providing play of a video game using location information for a mobile device, comprising:
   receiving, by a server, GPS location information from the mobile device;
   determining that the GPS location information indicates presence of the mobile device at a location, the location comprised of a plurality of sub-locations each associated with a corresponding one of a plurality of short range communication devices;

receiving, by the server, an indication that the mobile device has communicated with a particular one of the plurality of short range communication devices having a known location at one of the plurality of sub-locations;

determining, by the server, a game play reward for play of a video game based on the GPS location information of the mobile device and the indication that the mobile device has communicated with the particular one of the plurality of short range communication devices, the game play reward usable during play of the video game;

providing information of the game play reward from the server to a game device providing the video game;

receiving GPS location information from a further mobile device;

determining if the GPS location information from the further mobile device and the GPS location information from the mobile device indicates that the further mobile device and the mobile device are at a same location, such that locations of the mobile device and the further mobile device match; and transferring game play ownership of a game play item from a game player associated with the mobile device to a game player associated with the further mobile device, in response to the GPS location information from the further mobile device and the GPS location information from the mobile device indicating that the further mobile device and the mobile device are at the same location.

2. The method of claim 1, wherein the plurality of short range communication devices are near field communication (NFC) devices.

3. The method of claim 1, wherein the game device is the mobile device.

4. The method of claim 1, wherein the game device is a non-mobile device.

5. The method of claim 1, wherein the game device is a game console.

6. The method of claim 1, further comprising:
receiving, over time, in the server, a plurality of items of GPS location information from the mobile device, the plurality of items of GPS location information indicating different locations for the mobile device; and
determining, using the server, a further game play reward for play of the video game based on the plurality of items of GPS location information.

7. A system for use with respect to play of a video game, comprising:
a server configured by program instructions to:
receive GPS location information from a mobile device;
receive information indicating that the mobile device has communicated with a particular one of a plurality of short range communication devices associated with a location indicated by the GPS location information;
determine game play rewards for play of a video game based on the GPS location information received from the mobile device and the information indicating that the mobile device has communicated with the particular one of the short range communication devices located at the location; and
provide the game play rewards to a game device providing the play of the video game;
receive GPS location information from a further mobile device;
determine if the GPS location information from the further mobile device and the GPS location information from the mobile device indicates that the further mobile device and the mobile device are at a same location, such that locations of the mobile device and the further mobile device match; and
transfer game play ownership of a game play item from a game player associated with the mobile device to a game player associated with the further mobile device, in response to the GPS location information from the further mobile device and the GPS location information from the mobile device indicating that the further mobile device and the mobile device are at the same location.

8. The system of claim 7, further comprising the mobile device.

9. The system of claim 8, wherein the game device is a non-mobile game device configured for play of the video game.

10. The system of claim 7, wherein the short range communication devices are near field communication (NFC) devices.

* * * * *